May 7, 1935.　　　　M. HOLCZER　　　　2,000,757

DETACHABLE CONNECTER

Filed March 9, 1934

INVENTOR
Michael Holczer.
BY George J. Hoodling
ATTORNEY

Patented May 7, 1935

2,000,757

UNITED STATES PATENT OFFICE 2,000,757

DETACHABLE CONNECTER

Michael Holczer, Cleveland, Ohio

Application March 9, 1934, Serial No. 714,861

5 Claims. (Cl. 85—8)

My invention relates in general to detachable connecters and more particularly to a combination pin and lock wherein the pin is adapted to fit into an opening of the detachable connecter and wherein the lock is adapted to prevent the pin from working, or otherwise escaping, out of the opening.

An object of my invention relates to the provision of a pin having a reduced portion and locking means adapted to engage the reduced portion to lock the pin against escaping from an opening into which it may be mounted.

Another object of my invention relates to a lock having two complementary jaws adapted to engage a reduced portion of a pin which inter-connects two detachable parts.

Other objects and a fuller understanding of my invention may be had by referring to the following description and claims taken in conjunction with the accompanying drawing in which:

Figure 1:
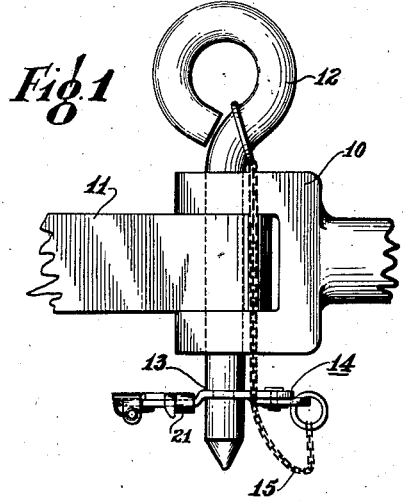
Figure 1 represents a view showing the manner in which my invention may be utilized.

With reference to Figure 1 of the drawing, I illustrate my invention as being employed to inter-connect a detachable coupling having two disengageable parts 10 and 11. There are many applications to which my invention may be employed, one of such applications is found in connection with farm implements in that the part 10 may designate the draw bar of a tractor, and the part 11 may represent the tongue for a farm implement such as a plow, and the like. Another use for my invention is found in connection with trailers for motor vehicles. In this connection the part 10 may designate the draw bar mounted on the rear end of a motor vehicle, and the part 11 may designate the tongue of the trailer. In such applications the pins heretofore used to inter-connect the draw bar and the tongue are disposed to work themselves out of the opening into which the pins are mounted, and thus the purpose of my invention is the provision of a combination pin and lock which prevents the pin from working, or otherwise escaping, out of the opening into which it is mounted. To this end my invention in general comprises a pin 12 having a reduced portion 13, and locking means 14 adapted to engage the reduced portion 13 of the pin.

Figure 2:
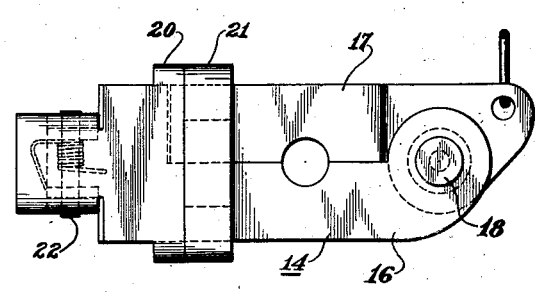
Figure 2 is a plan view looking downwardly of the locking feature of my invention.
Figure 4:
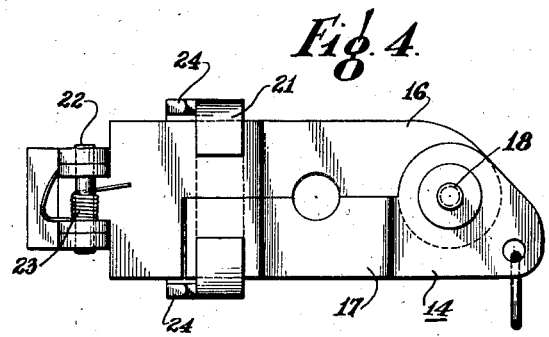
Figure 4 is a plan view looking upwardly of the locking feature of my invention.

The locking means which is designated by the reference character 14 comprises, in general, two complementary jaws 16 and 17 connected at one of their ends by means of a rivet 18, a slidable engaging member 21 for securing the two complementary jaws 16 and 17 in their closed position, and a retaining member 20 for retaining the slidable engaging member 21 in its engaging position. For the convenience of description the jaw 16 will be designated as the major jaw, and the jaw 17 will be designated as the minor jaw. Each of the two jaws is provided with a semi-circular cut-away portion so that when the two jaws are in their closed position the two semi-circular cut-away portions form a circular opening for engaging the depressed portion 13 of the pin 12. As illustrated, the major jaw 16 is provided with an extension which extends beyond the end of the minor jaw 17, and which is so positioned that its lateral edges are substantially in alignment with the lateral edges of the major and minor jaws when they are in their closed position. Slidably mounted upon the extension of the major jaw 16 is the slidable engaging member 21 which is adapted to be moved to the right as viewed in Figure 2, and thus engage the two complementary jaws 16 and 17. To retain the slidable engaging member 21 positively about the two jaws 16 and 17 there is provided a retaining member 20 which is hinged to the extension of the major jaw 16. As illustrated best in Figure 4 the hinged arrangement includes a pin 22 which extends through two tabs integrally formed with the retaining member 20 and two complementary tabs integrally formed with the extension of the jaw 17. In order to constrain the retaining member to lie against the extension of the major jaw 17 I utilize a spring 23 which normally biases the retaining member 20 against the extension of the major jaw 16.

Figure 3:
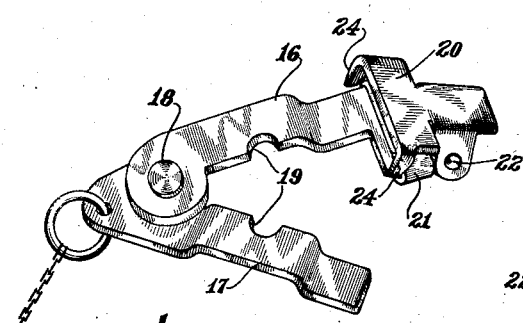
Figure 3 is a perspective view of the locking feature of my invention, being illustrated in its unlocked position.

The opened position of the jaws 16 and 17 is shown in Figure 3 and in this position the slidable engaging member 21 is interlocked under the retaining member 20. In order to prevent the slidable engaging member 21 from working itself from under the retaining member 20 when the complementary jaws 16 and 17 are in their open position, there are provided on the lateral edges of the retaining member 20 two depending tabs which engage the slidable engaging member 21, and thus prevents the slidable engaging member 21 from working out beneath the retaining member 21.

In attaching the locking means within the depressed portion 13 of the pin 12 the two complementary jaws 16 and 17 are positioned to engage the depressed portion 13, then the retaining member 20 is raised after which the slidable engaging member 21 is moved towards the pin for engaging the two complementary jaws 16 and 17. After the slidable engaging member 21 is moved beyond the end of the retaining member 20 the operator then releases the retaining member thus allowing the spring 23 to bias the retaining member 20 against the extension of the major jaw 17. By means of the joint action of the slidable engaging member 21 and the retaining member 20, the two complementary jaws 16 and 17 are positively secured in their closed position, being the position shown in Figures 2 and 4. This means that the two complementary jaws 16 and 17 lock the pin 12 from working, or otherwise escaping, out of the opening into which it may be mounted.

In disengaging the locking means from the pin 12 it is only necessary for the operator to raise the retaining member 20 and move the slidable engaging member 21 underneath the raised end of the retaining member 20, after which the operator releases the retaining member 20 which holds the slidable engaging member 21 underneath the raised end of the retaining member 20.

As illustrated best in Figure 3 the complementary jaws 16 and 17 at a point between the semi-circular cut-away portions 19 and the extension of the major jaw 17, are bent downwardly so that the upper surface of the retaining member 20 and the slidable engaging member 21 are slightly below the surface of the two complementary jaws 16 and 17 adjacent the part that engages the reduced portion 13 of the pin 12. This means that should the pin 12 be raised, or should the pin 12 tend to work out of the opening of the coupling the slidable engaging member 21 and the retaining member 20 will not be subject to injury by striking the underneath side of the part 10 of the coupling.

Figure 5:
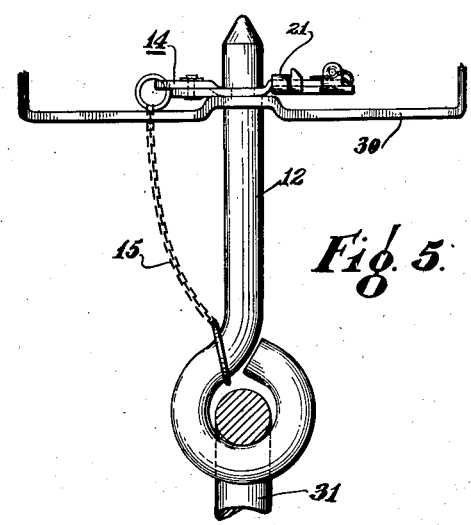
Figure 5 illustrates another use of my invention in addition to that shown in Figure 1.
Figure 6:
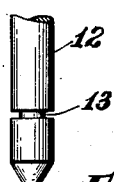
Figure 6 represents a fragmentary view of the lower end of a pin to which my locking means may be engaged.

In Figure 5 I illustrate a modified use of my combination pin and lock in that the pin 12 is connected to the tongue 31 of the drawn vehicle or implement, and that the forward end of the pin 12 is mounted within an opening of a cross-member 30 of the motor vehicle or the tractor. In this use of my invention the locking means 14 is subjected to the pull of the tractor or the motor vehicle. In this arrangement the space between the retaining member 20 and the cross-member 30 is relatively close so that the retaining member cannot be raised sufficiently to allow the slidable engaging member 21 to be moved under the retaining member 20 unless there is some clearance between that portion of the locking means adjacent the pin 12 and the depressed portion of the cross-member 30. Therefore, it is impossible for the locking means to become disengaged from the pin 12 so long as the motor vehicle or tractor is pulling the trailer or farm implement.

For the convenience of the operator, and to guard against losing the locking means 14 it may be suitably connected to the upper end of the pin 12 by means of a chain 15.

Since certain changes in my invention may be made without departing from the spirit and scope thereof, it is intended that all matters contained in the foregoing description and shown in the accompanying drawing shall be interpreted as illustrative and not in a limiting sense.

I claim as my invention:

1. A combination pin and lock wherein the pin is adapted to fit into an opening and wherein the lock is adapted to prevent the pin from working, or otherwise escaping, out of the opening, comprising a pin having a reduced portion, a major and a minor jaw hinged to each other at one end and adapted to engage the said reduced portion of the pin, the arrangement of the major and minor jaw being such that the major jaw is provided with an off-set extension which extends beyond the end of the minor jaw, and which is wider than the major jaw and is so positioned that its lateral edges are substantially in alignment with the lateral edges of the major and minor jaws when they are in their closed position, securing means adapted to slidably engage the said extension, said securing means being also adapted to slidably engage the major and minor jaws to secure them in their closed position, and means for retaining the securing means in its engaging position to recure the major and minor jaws in their closed position, whereby the arrangement of the jaws and securing means locks the pin against escaping from the opening.

2. A lock for a member having a reduced portion comprising, in combination, a major and a minor jaw hinged to each other at one end and adapted to engage the said reduced portion of the member, the arrangement of the major and minor jaw being such that the major jaw is provided with an off-set extension which extends beyond the end of the minor jaw, and which is wider than the major jaw and is so positioned that its lateral edges are substantially in alignment with the lateral edges of the major and minor jaws when they are in their closed position, securing means adapted to slidably engage the said extension, said securing means being also adapted to slidably engage the major and minor jaws to secure them in their closed position, and means for retaining the securing means in its engaging position to secure the major and minor jaws in their closed position.

3. A locking device comprising, in combination, a major jaw, an off-set extension connected to one end of the major jaw, said off-set extension being wider than the major jaw and having one edge thereof substantially in alignment with the outside edge of the major jaw, a minor jaw hinged to the other end of the major jaw and adapted to swing relative to both the major jaw and the extension, said minor jaw being of such width that, when the jaws are closed, the outside edge of said minor jaw is substantially in alignment with the corresponding outside edge of the extension, and securing means adapted to slidably engage the said extension, said securing means being also adapted to slidably engage the major and minor jaws to secure them in their closed position.

4. A locking device comprising, in combination, a major jaw, an off-set extension connected to one end of the major jaw, said off-set extension being wider than the major jaw and having one edge thereof substantially in alignment with the outside edge of the major jaw, a minor jaw hinged to the other end of the major jaw and adapted to swing relative to both the major jaw and the extension, said minor jaw being of such width that, when the jaws are closed, the outside edge of said minor jaw is substantially in alignment with the corresponding outside edge of the extension, securing means adapted to slidably engage the said extension, said securing means being also adapted to slidably engage the major and minor jaws to secure them in their closed position, and means for retaining the securing means in its engaging position to secure the major and minor jaws in their closed position.

5. A locking device comprising, in combination, a major jaw, an off-set extension connected to one end of the major jaw, said off-set extension being wider than the major jaw and having one edge thereof substantially in alignment with the outside edge of the major jaw, a minor jaw hinged to the other end of the major jaw and adapted to swing relative to both the major jaw and the extension, said minor jaw being of such width that, when the jaws are closed, the outside edge of said minor jaw is substantially in alignment with the corresponding outside edge of the extension, and securing means adapted to slidably engage the said extension, said securing means being also adapted to slidably engage the major and minor jaws to secure them in their closed position, and means hinged to the extension for retaining the securing means in its engaging position to secure the major and minor jaws in their closed position, said hinged means being also adapted to secure the slidable securing means on the extension when the jaws are unlocked.

MICHAEL HOLCZER.